（12）United States Patent
Koenigseder et al.

(10) Patent No.: US 9,756,590 B2
(45) Date of Patent: Sep. 5, 2017

(54) GATEWAY, NODES, AND METHOD FOR A VEHICLE

(71) Applicant: Bayerische Motoren Werke Aktiengesellschaft, Munich (DE)

(72) Inventors: Thomas Koenigseder, Wilfling (DE); Daniel Haase, Munich (DE); Max Kicherer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 237 days.

(21) Appl. No.: 14/491,317

(22) Filed: Sep. 19, 2014

(65) Prior Publication Data
US 2015/0003443 A1    Jan. 1, 2015

Related U.S. Application Data

(63) Continuation of application No. PCT/EP2013/055142, filed on Mar. 13, 2013.

(30) Foreign Application Priority Data

Mar. 22, 2012 (DE) ........................ 10 2012 204 586

(51) Int. Cl.
  *H04W 56/00* (2009.01)
  *H04L 12/64* (2006.01)
  *H04J 3/06* (2006.01)
  *H04L 12/46* (2006.01)
  *H04W 40/20* (2009.01)
  (Continued)

(52) U.S. Cl.
  CPC ....... *H04W 56/0025* (2013.01); *H04J 3/0655* (2013.01); *H04J 3/0667* (2013.01); *H04L 12/4625* (2013.01); *H04L 12/6418* (2013.01); *H04W 40/20* (2013.01); *H04W 56/0045* (2013.01); *H04L 2012/40208* (2013.01); *H04L 2012/40215* (2013.01); *H04L 2012/40241* (2013.01); *H04L 2012/40273* (2013.01);
  (Continued)

(58) Field of Classification Search
  None
  See application file for complete search history.

(56) References Cited

U.S. PATENT DOCUMENTS 6,735,223 B1  5/2004  Woo et al.
6,873,889 B2  3/2005  Vollmer et al.
(Continued)

FOREIGN PATENT DOCUMENTS

CN    1303200 A    7/2001
CN    101478460 A   7/2009
(Continued)

OTHER PUBLICATIONS

International Search Report dated Jul. 11, 2013 with English translation (seven (7) pages).
(Continued)

*Primary Examiner* — Min Jung
(74) *Attorney, Agent, or Firm* — Crowell & Moring LLP

(57) ABSTRACT

A gateway for a vehicle communication system is configured to forward a payload message from a first node of a first fieldbus system to a second node of a second fieldbus system, wherein the first and the second fieldbus systems are different. The gateway is configured to synchronize a first clock in the first node with a second clock in the second node.

16 Claims, 4 Drawing Sheets

(51) Int. Cl.
 *H04L 12/40* (2006.01)
 *H04W 84/00* (2009.01)
 *H04W 84/18* (2009.01)
 *H04W 88/16* (2009.01)

(52) U.S. Cl.
 CPC .......... *H04W 84/005* (2013.01); *H04W 84/18* (2013.01); *H04W 88/16* (2013.01)

(56) References Cited

U.S. PATENT DOCUMENTS

| | | | | |
|---|---|---|---|---|
| 7,430,261 | B2* | 9/2008 | Forest | H03M 13/43 370/392 |
| 8,321,612 | B2 | 11/2012 | Hartwich et al. | |
| 2005/0251701 | A1 | 11/2005 | Fredriksson | |
| 2006/0029139 | A1* | 2/2006 | Teichner | H04L 43/106 375/240.28 |
| 2006/0083265 | A1* | 4/2006 | Jordan | H04J 3/0682 370/503 |
| 2007/0094528 | A1* | 4/2007 | Fredriksson | H04L 12/40026 713/375 |
| 2010/0001770 | A1* | 1/2010 | Bogenberger | H04J 3/0641 327/144 |
| 2011/0128855 | A1* | 6/2011 | Ando | H04J 3/0652 370/236 |
| 2011/0160951 | A1 | 6/2011 | Ishigooka et al. | |
| 2011/0235648 | A1* | 9/2011 | Ando | H04J 3/0652 370/401 |
| 2012/0057479 | A1 | 3/2012 | Maruyama et al. | |
| 2012/0102240 | A1* | 4/2012 | Wei | H04L 12/403 710/30 |
| 2012/0113773 | A1* | 5/2012 | Matsuo | G07C 5/085 369/21 |
| 2012/0278507 | A1* | 11/2012 | Menon | H04J 3/0655 709/248 |
| 2013/0166778 | A1* | 6/2013 | Ishigooka | H04L 12/4035 709/248 |
| 2014/0177656 | A1* | 6/2014 | Mian | G01D 9/005 370/512 |
| 2015/0257024 | A1* | 9/2015 | Baid | H04W 24/10 370/338 |

FOREIGN PATENT DOCUMENTS

| | | |
|---|---|---|
| DE | 10 2005 018 837 A1 | 10/2006 |
| DE | 10 2008 062 994 A1 | 6/2010 |
| DE | 10 2009 026 641 A1 | 12/2010 |
| DE | 10 2010 023 070 A1 | 3/2011 |
| DE | 10 2010 031 514 A1 | 6/2011 |
| WO | WO 01/89151 A1 | 11/2001 |
| WO | WO 2009/026597 A1 | 3/2009 |
| WO | WO 2010/139504 A1 | 12/2010 |

OTHER PUBLICATIONS

German Search Report dated Aug. 10, 2012 (ten (10) pages).
Chinese Office Action issued in Chinese counterpart application No. 201380022718.4 dated Dec. 5, 2016 (Thirteen (13) pages).

* cited by examiner

400

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Resolution: 1s | | | | Resolution: 62.25ms | | | | Resolution: 3.9ms | | | | Resolution: 244us | | | |
| | | | | | | | | | | | | | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | F1 | | | | | | | | | | | | |
| | | | F2 | | | | | | | | | | | | |

GATEWAY, NODES, AND METHOD FOR A VEHICLE

CROSS REFERENCE TO RELATED APPLICATIONS

This application is a continuation of PCT International Application No. PCT/EP2013/055142, filed Mar. 13, 2013, which claims priority under 35 U.S.C. §119 from German Patent Application No. 10 2012 204 586.4, filed Mar. 22, 2012, the entire disclosures of which are herein expressly incorporated by reference.

BACKGROUND AND SUMMARY OF THE INVENTION

The invention relates to a gateway for a vehicle. Furthermore, the invention relates to a node of a bus system in a vehicle. Furthermore, the invention relates to a method for the synchronization of bus systems in a vehicle.

Current vehicles comprise a multiplicity of sensors, actuators and control devices which control and regulate a multiplicity of functions of the vehicle. This multiplicity of components is interconnected in the vehicle via communication systems composed of different bus systems in order to enable an exchange of data between the multiplicity of components. Examples of bus systems in vehicles are e.g. synchronous FlexRay bus systems, asynchronous CAN (Controller Area Network) bus systems or synchronous MOST (Media Oriented Systems Transport) bus systems, which are usually interconnected via a gateway. The components connected to the different bus systems can thus exchange information relating to the operating conditions and further relevant data in the vehicle and can initiate suitable control and regulation measures.

One object of the present invention is to provide an improved gateway for a vehicle. A further object of the present invention is to provide an improved node of a bus system in a vehicle. Finally, a further object of the present invention is to provide an improved method for the synchronization of bus systems in a vehicle.

These and other objects are achieved according to the invention.

If the exchange of data takes place beyond the boundaries of an essentially synchronous bus system (e.g. of a FlexRay bus system), no facility exists in current vehicles to determine the exact age of the exchanged data. In other words, the recipient of the data cannot determine exactly how long ago the exchanged data were dispatched by the sender of the data. In other words again, it is not possible in current vehicles to detect and precisely determine a latency in the data transmission beyond the boundaries of an essentially synchronous bus system (e.g. of a FlexRay bus system). The present invention addresses these technical problems. In particular, the present invention describes devices and methods which enable the "age" of exchanged data in a vehicle to be determined (even beyond the boundaries of a bus system).

According to one aspect of the invention, a gateway for a vehicle is described. The gateway may be a gateway which interconnects a multiplicity of different bus systems and which enables an exchange of messages between the nodes of the multiplicity of different bus systems. The gateway can also be referred to as a bus system coupler or bus system transition. The gateway is typically configured to forward a payload message from a first node of a first fieldbus system to a second node of a second fieldbus system. The first and second fieldbus systems may be different. For this purpose, the gateway can receive the payload message as a node of the first fieldbus system. The payload message is typically encoded in the first fieldbus system according to a first protocol of the first fieldbus system. The gateway can then encode the received payload message into a payload message according to a second protocol of the second fieldbus system, and can transmit the transcoded payload message as a node of the second fieldbus system to the second node. The gateway is typically also configured to forward a payload message from the second node to the first node.

The first and/or second node comprise e.g. in each case a sensor, an actuator and/or a control device (Electronic Control Unit). Consequently, the payload message can include measurement data and/or control data. Furthermore, the payload message can include a timestamp which indicates a generation time of the measurement data and/or the control data. The first fieldbus system may be a serial, asynchronous fieldbus system, such as e.g. a CAN fieldbus system. The second fieldbus system may be a serial, synchronous fieldbus system, such as e.g. a FlexRay fieldbus system.

The gateway is configured to synchronize a first clock in the first node with a second clock in the second node. The first and/or second clock may comprise an oscillator, i.e. a clock generator, and/or a counter. For example, the counter of the first and/or second clock may be incremented/decremented depending on the oscillator (i.e. depending on the clock generator) in order to indicate a specific clock time. The synchronization of the first and second clock can be effected e.g. in that the counters of the first and second clock have corresponding (e.g. the same) counter readings at the same time. Due to the synchronization of the clocks, it can be achieved that a timestamp generated on the basis of the first clock which is transmitted in the payload message makes a clear statement in the second node regarding the time period that has elapsed since the generation of the timestamp.

In order to synchronize the first and second clock, the gateway can be configured to determine a timestamp on the basis of a reference time. This reference time may be, e.g., a time of a clock of the gateway. In embodiments, the reference time can be determined on the basis of a time received by a GPS receiver of the vehicle and/or on the basis of a time received by an instrument cluster of the vehicle. The timestamp can be transmitted to the first node in a first message according to the first protocol of the first fieldbus system. In the same way, the timestamp (or a different timestamp determined on the basis of the reference time) can be transmitted to the second node in a second message according to the second protocol of the second fieldbus system. The first and the second protocols typically differ from one another. For example, the first protocol is a CAN protocol and the first message is a CAN telegram. The second protocol may be a FlexRay protocol and the second message may be a FlexRay frame in a time window of a FlexRay cycle.

In particular, the gateway can be configured to synchronize the first clock in the first node with the second clock in the second node using a Precision Time Protocol (PTP) method. In other words, the first and second message may be a Sync Message and/or a Follow_Up Message. For example, the gateway can be configured to transmit the timestamp (e.g. using a Sync Message and/or a Follow_Up Message to the first and/or second node). Furthermore, the gateway can be configured to enable the first and/or second node to determine a round trip time, a cycle time and/or a message transit time. To do this, the gateway can receive, e.g., a Delay_Req Message from the first and/or second node and reply with a Delay_Resp Message to the first and/or second node. The first and/or the second node can then synchronize their respective clocks using the time stamp and with knowledge of the transit time of the first or second message.

The gateway can also be configured to generate the timestamp as a segment or as a subdomain from a PTP timestamp. Typical PTP timestamps have a length of 10 bytes and indicate an absolute time (e.g. the UNIX time from midnight on 1.1.1970). Due to the limited length of the messages defined in the first and/or second protocol, it may be advantageous to generate a shortened timestamp from the PTP timestamp, wherein the shortened timestamp comprises a specific maximum measurable time period and enables a specific time resolution. For example, the (shortened) time period which is transmitted in the first and/or second message can be generated from a nanosecondsField of the PTP timestamp. The (shortened) timestamp can be selected, for example, in such a way that the maximum measurable time period of the timestamp corresponds to a transit time (e.g. a predefined maximum possible transit time) of the payload messages from the first node to the second node, or exceeds said transit time. It can thereby be ensured that the second node can clearly determine the time period since the generation of the (shortened) timestamp.

The gateway can be configured to transmit the second message in a predefined time window of the second bus system. For example, the predefined time window may be a predefined, recurring slot in which the gateway is allowed to transmit messages in the second bus system (e.g. a synchronous bus system). The timestamp can then be defined in such a way that the timestamp corresponds to a time of the predefined time window. In other words, the timestamp which is transmitted in the second message can be defined in such a way that the timestamp matches the transmit time of the second message. This enables the second node in a synchronous bus system (e.g. in a FlexRay bus system) to use the timestamp directly in order to synchronize the second clock without it requiring a further Follow_Up Message and/or further Delay_Req/Delay_Resp Messages. The required data overhead for the time synchronization can thus be reduced.

According to a further aspect of the invention, a node is described for a CAN bus system. The node includes a clock which is designed to define a timestamp with a predefined measurable time period and a predefined time resolution. In preferred exemplary embodiments, the clock of the CAN node is designed to be synchronized with a reference time (e.g. the reference time of the aforementioned gateway). To do this, the node can be designed to carry out the synchronization methods described herein (in particular the PTP-based synchronization method described herein). Furthermore, the node includes a control unit which is designed to provide a payload to be transmitted with a payload timestamp. It is thus possible to inform other nodes of the age of the payload to be transmitted.

The payload timestamp can have a shortened measurable time period as the predefined measurable time period and/or an increased time resolution as the predefined time resolution. In other words, the CAN node can be configured to generate shortened payload timestamps in order to thus reduce the overhead for the payload timestamp in the data field of the CAN telegram.

According to a further aspect of the invention, a method is described for synchronizing a time in a synchronous bus system of a vehicle. The method comprises the determination of a timestamp on the basis of a reference time, and the determination of a time interval up until a transmit time window of the synchronous bus system. The time stamp is then corrected using the determined time interval (e.g. the timestamp is added to the determined time interval) in order to determine a corrected timestamp. A message with the corrected timestamp is then transmitted within the transmit time window. Due to the corrected timestamp, a receiver node in the synchronous bus system is enabled to synchronize its clock directly with the reference time on the basis of the corrected timestamp without exchanging further messages. Consequently, the synchronization method for synchronous bus systems can be designed as more efficient due to the correction.

The method can also serve to synchronize the time in an asynchronous bus system. For this purpose, the method can comprise the transmission of a further message with the timestamp and the time interval in the asynchronous bus system, wherein the asynchronous bus system is different from the synchronous bus system. Through the knowledge of the timestamp and the time interval, a node in the asynchronous bus system is enabled to select the transmit time of a message which is intended for a node in the synchronous bus system in such a way that the transit time of the message is reduced.

It must be noted that the methods, devices and systems described in this document can be used both alone and in combination with other methods, devices and systems described herein. Furthermore, any aspects of the methods, devices and systems described herein can be combined with one another in diverse ways.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4a shows an example of a timestamp;

FIG. 4b shows an example of a timestamp and possible sub-timestamps;

DETAILED DESCRIPTION OF THE DRAWINGS

Figure 1:
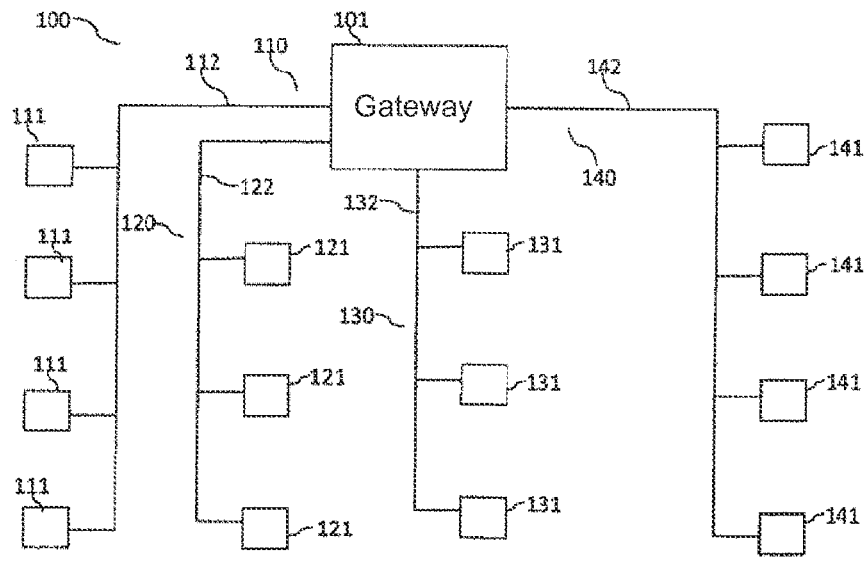
FIG. 1 is a schematic block diagram of an exemplary communication system for a vehicle with a multiplicity of different bus systems.

FIG. 1 shows an example of a communication system 100 for a vehicle (e.g. a motor vehicle or automobile). The system 100 includes a central gateway 101 to which different bus systems 110, 120, 130, 140 are connected. The bus system 110 is e.g. an Ethernet bus system, the bus system 120 is e.g. a synchronous FlexRay bus system, the bus system 130 is e.g. an asynchronous CAN (Controller Area Network) bus system, and the bus system 140 is e.g. a synchronous MOST (Media Oriented Systems Transport) bus system. Different components of the vehicle (such as e.g. sensors, actuators and/or control devices (Electronic Control Units, ECU)) are connected to the respective bus systems. Thus, the components 111 are connected to the bus 112 of the bus system 110, the components 121 to the bus 122 of the bus system 120, the components 131 to the bus 132 of the bus system 130, and the components 141 to the bus 142 of the bus system 140.

Figure 2A:
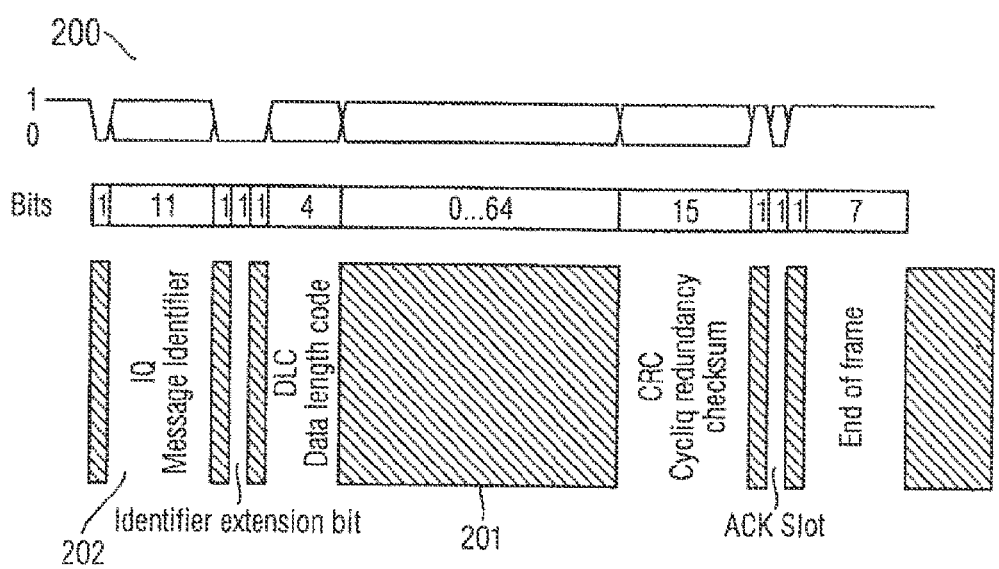
FIG. 2a shows an example of a CAN telegram.

The components can forward data as transmitters to the bus or take data as receivers from the bus according to the protocol of the respective bus system. FIG. 2a shows an example of a CAN data telegram 200 in the Base Frame Format. In particular, it can be seen from FIG. 2a that a CAN data telegram 200 can transmit around 8 bytes of payload 201 along with a multiplicity of control data, transmitter data (ID message identifiers) 202 and error detection data (Cyclic Redundancy Check). In total, the CAN bus system 130 enables a data transmission rate of max. 1 Mbit/s (typically 500 kbit/s). A node 131 of the CAN bus system 130 can dispatch a CAN data telegram 200 at any time. In order to avoid a loss of data telegrams 200 (in the event of message collisions), a bit-by-bit arbitration takes place between competing transmitters and their telegrams 200 on the basis of the message identifiers 202 of the telegrams 200 to be transmitted. Each transmitter 131 monitors the bus just as it transmits the identifier 202 of its telegram 200. If two nodes 131 transmit simultaneously, the first dominant bit of one of the two telegrams 200 overwrites the correspondingly recessive bit of the other telegram 200, which the latter node detects and terminates its transmission attempt. A prioritization of the different nodes 131 of a CAN bus system 130 can thus take place through allocation of suitable message identifiers 202. This can be used, for example, to assign a relatively high priority to a telegram 200 which is used for the time synchronization. The CAN protocol is standardized as ISO 11898.

Figure 2B:
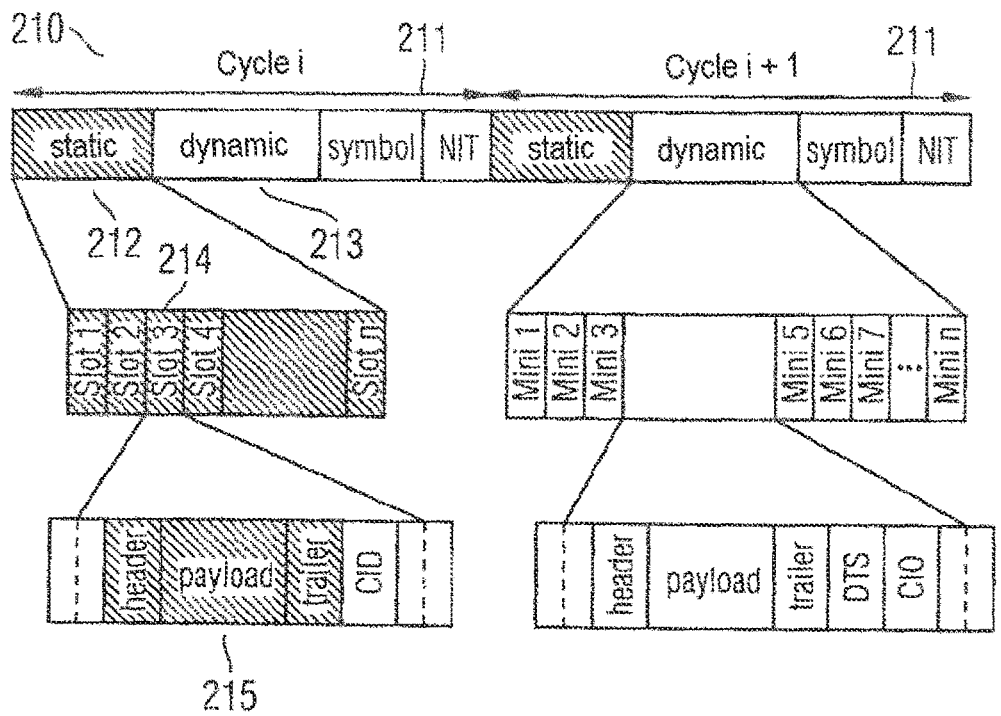
FIG. 2b shows an example of a FlexRay cycle structure.

The FlexRay bus system 120 is a serial and synchronous fieldbus system for use in vehicles. The FlexRay standard is currently being converted into an ISO standard. FIG. 2b shows the communication structure 210 of the FlexRay bus system 120. FlexRay is based on a defined TDMA (Time Division Multiple Access) scheme in which time windows (referred to as slots) are defined for the different nodes 121 of the bus system 120. The communication on the FlexRay bus system 120 takes place in fixed, predefined cycles 211. Each of these cycles 211 is, inter alia, subdivided into a static segment 212 and a dynamic segment 213. In the static segment 212, a specific slot 214 (i.e. a specific time window) in which the node 121 can transmit messages is allocated to each node 121 of the FlexRay bus system 120. The node 121 must not overwrite the temporal length of its slot 214. If the message is too long, the next cycle or the dynamic segment 213 must be used to continue the message. The static segment 212 is thus a deterministic part of the FlexRay protocol with which it can be ensured that important messages of a node 121 (e.g. important messages of a node 121 which is connected to a sensor on a brake of the vehicle) are transmitted within a known time. The dynamic segment 213 can be used by all nodes 121 to transmit further information (e.g. the remaining part of a message). Furthermore, each cycle 211 includes an NIT (Network Idle Time) which enables the node 121 of the FlexRay bus system 120 to synchronize itself with the clock of the FlexRay bus 122. Typical transmission rates of a FlexRay bus system 120 are 10 Mbit/s. Up to 254 bytes of the payload 215 can be transmitted in a time window 214.

In frequent cases, messages have to be transmitted from a transmit node of a first bus system to a receive node of a second (different) bus system. In a vehicle, for example, a front camera can be connected via a node 121 to the FlexRay bus 122. A ground unevenness of the road on which the vehicle is traveling could be determined using this front camera. In particular, it could be determined that this ground unevenness is located at a specific distance from the vehicle, so that, taking into account the traveling speed, it can be determined when the vehicle will travel over the ground unevenness. The node 121 transmits a FlexRay message in which e.g. the instantaneous distance of the ground unevenness is indicated via the FlexRay bus 122. The message is received by the gateway 101, is converted into a CAN message and forwarded onto the CAN bus 132 in order to inform a shock absorber (node 131) connected to the CAN bus 132 of the instantaneous distance of the ground unevenness, so that the shock absorber can be configured to increase the traveling comfort for the oncoming ground unevenness.

The shock absorber receives information relating to the distance of the ground unevenness determined by the front camera. However, the shock absorber does not know the time at which the distance was determined, and cannot therefore determine when the shock absorber has to be configured for the ground unevenness in order to increase the traveling comfort. Due to an undefined latency in the data transmission in the gateway 101 and in the transmission on the CAN bus 132, it is not possible for the node 131 (i.e. for the shock absorber) to determine the exact age of the received information. A maximum latency and therefore a maximum age of the received information can be determined only—if at all—on the basis of maximum observations. Consequently, a time-critical vehicle function which requires the transport of data beyond the boundaries of bus systems cannot be implemented with the currently available means. In particular, the shock absorber described above cannot respond to a ground unevenness determined by the front camera in order to thus increase the traveling comfort.

It is therefore proposed herein to synchronize the (logical) clocks in the nodes 111, 121, 131, 141 of the different bus systems 110, 120, 130, 140 with one another and therefore create a common time basis within the different bus systems 110, 120, 130, 140 of the vehicle. It is thus possible to provide the messages exchanged between the nodes 111, 121, 131, 141 with a timestamp which enables the recipient of the message to determine the exact age of the information (e.g. a measured value) contained in the message.

Figure 3:
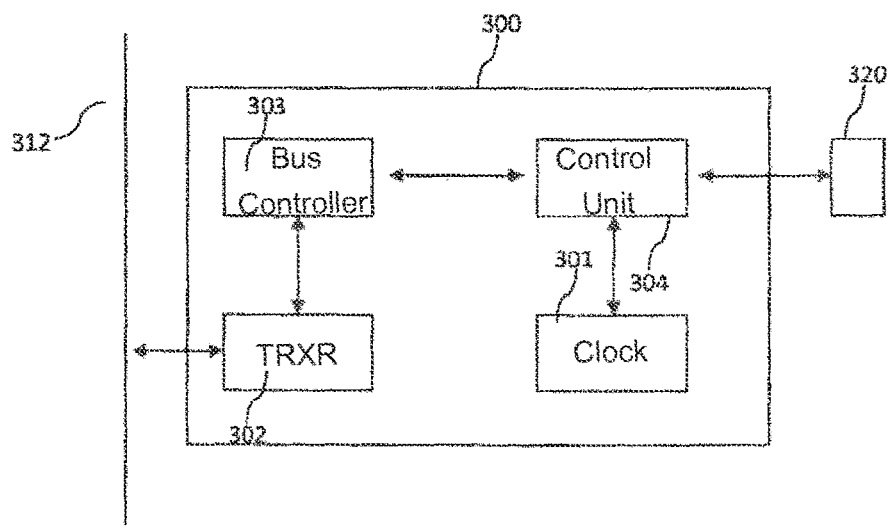
FIG. 3 is a schematic block diagram of an exemplary node of a bus system.

FIG. 3 shows an example of a node 300 of a bus system (e.g. a bus system 110, 120, 130, 140 from FIG. 1), wherein the node 300 communicates via the bus 312 (e.g. one of the buses 112, 122, 132, 142 from FIG. 1). The node 300 includes a clock 301 which has e.g. an oscillator or clock generator and a counter (e.g. a millisecond counter) with which an absolute time (e.g. the UNIX time, which is calculated from midnight on Jan. 1, 1970) and/or a relative time (e.g. the time that has elapsed since the last overflow of a counter of the clock 301) can be provided. Furthermore, the node 300 includes a bus transceiver 302 which transmits and receives messages on the physical layer of the respective bus system, and a bus controller 303 which converts the bus protocol of the respective bus system and, for example, generates and interprets the message structures shown in FIG. 2a and FIG. 2b. In addition, the node 300 includes a control unit 304 (e.g. a microprocessor) which evaluates received data and thus controls an actuator 320 (e.g. the above-mentioned shock absorber) and/or which collects data from a sensor 320 (e.g. the above-mentioned front camera)

and, if necessary, evaluates and, if necessary, dispatches said data via the bus controller 303.

In order to produce a common (absolute or relative) time basis of the different nodes 300 (i.e. the nodes 111, 121, 131, 141) in a vehicle, the time basis of a selected node (referred to as the master node) can be distributed to the other nodes 300 of the system 100. For example, the gateway 101 can assume the role of the master node. The master node distributes the clock time of the master node to the nodes 111, 121, 131, 141 of the different bus systems 110, 120, 130, 140. The latter synchronize the clock time of their clocks 301 with the clock time of the master node. On the basis of the synchronized clocks 301 in the multiplicity of nodes of the vehicle, the messages of a node which are to be dispatched can now be provided with a timestamp. The timestamp enables a receiver node (even a receiver node in a bus system other than that of the transmitter) to determine the exact age of the information contained in the message.

To carry out the time synchronization, the Precision Time Protocol (PTP) is described as being used herein. The PTP protocol is standardized in IEEE 1588/IEEE 802.1 AS. However, it must be noted that other methods can also be used to synchronize the times of the clocks 301 in the nodes 300 of the different bus systems. However, it is advantageous that the PTP protocol can already be used in an Ethernet bus system 110 and can be transferred in the manner shown here to other bus systems (e.g. a CAN bus system 130 and/or a FlexRay bus system 120).

According to the PTP protocol, the master node (e.g. the gateway 101 as the "Boundary Clock", BDC) distributes its clock time T1 in "Sync Messages" among the other nodes (the "slave nodes") of the system 100. A slave node 300 receives the Sync Message and notes the receive time T2 (in relation to the clock time of the slave node 300). In addition, the master node can transmit a Follow_Up Message in order to inform the slave node that the clock time at the dispatch time of the Sync Message was T1. A slave node 300 thus knows T1 and T2 and can therefore calculate the transit time of the Sync Message and update the clock time of its clock 301. It should be noted that the PTP protocol also describes further messages (e.g. Delay_Req Message, Delay_Resp Message) which can similarly be used for the time synchronization of the nodes in the system 100. The time synchronization can be repeated at a specific frequency (e.g. once per second) in order to compensate a drifting apart from one another of the clock times of the clocks 301 of the nodes 300 in the system 100.

The time synchronization is described below specifically for CAN bus systems 130 and FlexRay bus systems 120. In CAN bus systems 130, the master node (e.g. the gateway 101) forwards one or more telegrams 200 with a Sync Message and one or more following telegrams 200 with a Follow_Up Message onto the CAN bus 132. Here, the master node preferably uses a high-priority Message Identifier 202 in order to ensure that the telegrams 200 are preferred in the event of a possible arbitration. A slave node 131 on the CAN bus 132 can synchronize its respective clock 301 using the time information contained in the telegrams 200.

As shown in FIG. 2a, a telegram 200 only includes space for a payload of a maximum of 8 bytes. Furthermore, the transmission rates/bandwidths of CAN bus systems 130 are limited. On the other hand, the timestamps and clock times used in the PTP protocol have a length of up to 10 bytes (e.g. to transmit the absolute UNIX time). In view of the limited payload that can be transmitted in the CAN telegram 200 and in view of the limited bandwidths, it may be advantageous to carry out only the synchronization of a relative time (i.e. a time indicating the time period since a recurring event, such as e.g. a counter overflow).

It is generally possible to determine the maximum dwell time of a message within the system 100. This is usually derived from the specification of the system 100. For example, it can be assumed that the system 100 has a maximum jitter and/or a maximum latency (e.g. 20 ms). It can thus be assumed that a message dispatched by a first node is received by a second node of the system 100 after a maximum transit time at the latest. In order to be able to interpret a timestamp of the transmitted message unambiguously, the knowledge of an absolute time (e.g. the UNIX time) is therefore not usually necessary, but rather it can suffice that the receiver node can determine an unambiguous difference (i.e. a time interval) between the timestamp in the message and the time of the clock 301 of the receiver node. If it is assumed that the maximum possible time period between the acquisition of a measured value on the transmitter node and the reception of the measured value on the receiver node is $T_{max}$, a relative statement relating to the time in a time interval $[0, T_{max}]$ is sufficient to enable the receiver node to determine unambiguously the time period that has elapsed since the acquisition of a measured value.

On the basis of the aforementioned considerations, it can therefore be advantageous to synchronize a relative time which is periodically reset (to zero) at a frequency of $1/T_{max}$ and which indicates how much time has elapsed since the last time reset. $T_{max}$ is referred to below as the measurable time period. If it is ensured that the measurable time period $T_{max}$ exceeds a maximum possible signal transit time through the system 100, an unambiguous temporal arrangement of events (i.e. an unambiguous causal arrangement) can be produced. For example, $T_{max}=1$ s could be chosen as the measurable time period, which exceeds the value of typical signal transit times in vehicles of 20 ms.

The synchronization of a relative time of this type usually requires less bandwidth than the synchronization of an absolute time. For example, 10 bytes are used for the synchronization of the absolute time (the UNIX time) in the PTP protocol. A measurable time period $T_{max}=1$ s with a time resolution down to the µ second range could be achieved by using the upper two bytes of the PTP nanosecondsField. This is shown by way of example in FIG. 4a. FIG. 4a shows a timestamp 400 which includes the aforementioned two bytes from the PTP nanosecondsField. Furthermore, FIG. 4a shows the resolutions that can be achieved with the different bits. The timestamp 400 covers a measurable time period of $T_{max}=1$ s, wherein a resolution of the measurable time period of 15.25 µs can be achieved using the two bytes.

FIG. 4b shows the timestamp 410 which similarly includes the aforementioned two bytes from the PTP nanosecondsField. It is furthermore shown that sub-timestamps, such as e.g. F1 411 and/or F2 412, can be formed from the timestamp 410, depending on the measurable time period $T_{max}$ and/or time resolution that is required. For example, the sub-timestamps F1 411 and F2 412 enable a measurable time period $T_{max}=124.5$ ms. The 4-bit long sub-timestamp F1 411 enables a resolution of 7.8 ms and the 8-bit long sub-timestamp F2 412 enables a resolution of 488 µs.

As shown in FIGS. 4a and 4b, a sufficient measurable time period $T_{max}$ and a sufficient time resolution can already be achieved with a timestamp 400 with a length of 2 bytes. It may therefore suffice for the master node (e.g. the gateway 101) to synchronize its clock time with the slave nodes of some or all of the bus systems 110, 120, 130, 140 on the basis of the timestamp 400 (or sub-timestamp 411, 412). In particular, the shorter timestamp 400 enables a transmission within a CAN telegram 200. However, the shorter timestamp can also be used in the other bus systems, e.g. in the FlexRay bus system 120, in order to reduce the data overhead for the time synchronization.

To summarize, a shortened timestamp (and therefore a relative time) can be determined by using an area of the complete PTP timestamp, the maximum measurable time period $T_{max}$ and time resolution of which are sufficient to synchronize the clocks 301 of the nodes 111, 121, 131, 141 of the different bus systems 110, 120, 130, 140 with a reduced data overhead.

The synchronization of the time (e.g. the synchronization of the relative time on the basis of the maximum measurable time period $T_{max}$) in synchronous bus systems (such as e.g. in the FlexRay bus system 120) can be designed to be even more efficient if the slot 214 of the master node within the synchronous bus system is taken into account in the transmission of the aforementioned Sync Message. In synchronous bus systems, a slave node can precisely determine the transmit time of a message. Consequently, a slave node can directly take over the clock time transmitted in a Sync Message if this clock time matches the transmit slot 214 of the master node. The latter can be achieved in that the master node takes account of the time of its transmit slot 214 in the generation of a Sync Message and increases the actual clock time by an offset, wherein the offset corresponds to the difference between the current clock time and the time of the next available transmit slot 214. The timestamp of the Sync Message thus represents the time of the transmit slot 214, so that a slave node can use the timestamp of the Sync Message to synchronize the clock time of its clock 301 without the need for an additional Follow_Up Message. The time synchronization can thus be designed to be more efficient in synchronous bus systems (such as e.g. the FlexRay bus system 120) since a Follow_Up Message can be dispensed with.

Figure 5:
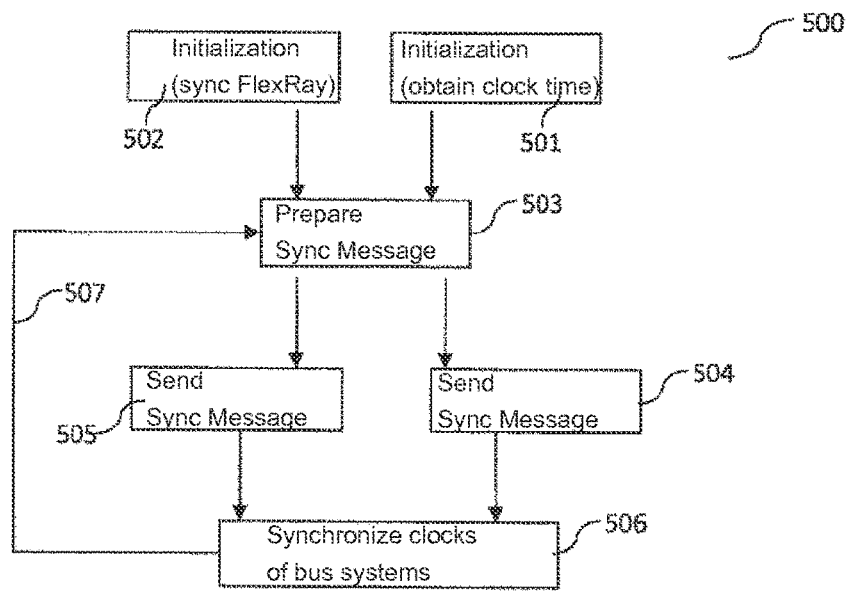
FIG. 5 is a flow chart of an exemplary method for synchronizing the clock time in a multiplicity of bus systems.

FIG. 5 shows an example of a time synchronization method 500 that can be carried out by a master node (for example the gateway 101). The method 500 represents an example of the time synchronization in an asynchronous CAN bus system 130 and in a synchronous FlexRay system 120. The method 500 begins with initialization steps in which e.g. a synchronization of the FlexRay bus system 120 is awaited or carried out (step 502). Furthermore, the master node possibly obtains a clock time from a higher-order GrandMaster node (Step 501). For example, the master node (e.g. the gateway 101) can receive a clock time from a GPS receiver and/or from an instrument cluster of the vehicle. In step 503, the master node prepares the Sync Message with the suitable timestamp. As explained above, it may be advantageous if the suitable timestamp is provided with an offset in such a way that the clock time of the timestamp matches the exact time of the transmit slot 214 of the master node on the FlexRay bus 122. The Sync Message is then dispatched on the CAN bus 132 (step 505) and on the FlexRay bus 122 (step 504). In the case of the asynchronous CAN bus system 130, the master node dispatches the Sync Message at the time indicated in the timestamp of the Sync Message. Furthermore, the master node also dispatches the above-mentioned Follow_Up Message. The nodes 131, 121 of the CAN bus system 130 and of the FlexRay bus system 120 can synchronize the clock time of their clocks 301 with this information, so that the nodes 131, 121 know the clock time of the system 100 (according to the maximum measurable time period and resolution of the timestamp 400 transmitted in the Sync Message/Follow_Up Message) (step 506). This synchronization process can be regularly repeated (step 507) in order to retain a synchronization of the clock time in the nodes. Typical repetition rates are e.g. once per second.

Due to the time synchronization, the nodes 111, 121, 131, 141 of the system 100 have a common time basis (with a maximum measurable time period $T_{max}$ and a maximum time resolution derived from the timestamp 400 distributed by the master node). The common time basis is measured in the clocks 301 of the nodes 111, 121, 131, 141 and is continued using a clock generator (e.g. an oscillator). A transmit node (e.g. a transmit node 131 on the CAN bus 132) can thus provide a message relating to a sensor measured value with a timestamp which represents the precise time of the measured value. The complete timestamp 400, 410 can be used as the timestamp (see FIG. 4b). This timestamp requires 2 bytes of the available 8 bytes of the payload of a CAN telegram 200. If this is still too much, sub-timestamps, e.g. sub-timestamp F1 411 or sub-timestamp F2 412 (see FIG. 4b), can be used so that only 4 bits or 1 byte of the available 8 bytes of the payload are consumed. In other words, a functionally meaningful area of the timestamp 410 can be used in order to reduce the overhead for the timestamp in relation to the payload. The transmitter and receiver of the sub-timestamp can be aligned with one another through a suitable encoding/application in order to define the meaningful area of the sub-timestamp.

The message comprising the measured value and the (sub-)timestamp is transmitted via the gateway 101 to a receiver node (e.g. a node 121 on a FlexRay bus 122) which can evaluate the (sub-)timestamp and is thus informed of the precise measurement time of the measured value. For example, a shock absorber (receiver node 131 on a CAN bus 132) can thus be informed of the precise time of the distance determination of a ground unevenness by a front camera (transmitter node 121 on a FlexRay bus 122) and can thus respond in a temporally correct manner to the oncoming ground unevenness in order to thus increase the traveling comfort.

Figure 6:
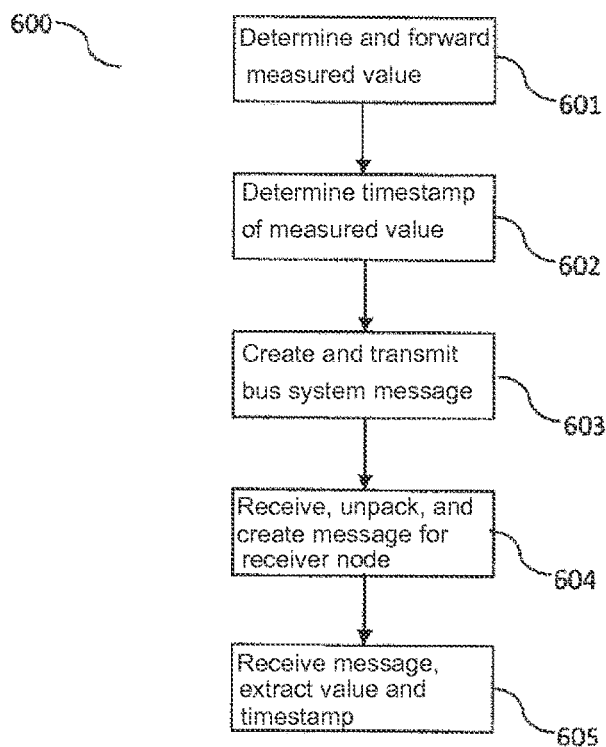
FIG. 6 is a flow chart of an exemplary method for transmitting messages with timestamps.

A method 600 for exchanging messages via different bus systems is shown in FIG. 6. In step 601, the transmit node determines a measured value via the sensor 320 which is forwarded to the control unit 304 of the transmit node. The control unit 304 determines the (sub-)timestamp of the measured value using the clock 301 of the transmit node (step 602). The bus controller 303 then packs the measured value together with the (sub-)timestamp into a message of the bus system (step 603) and the message is transmitted via the bus 310 to the gateway 101 using the bus transceiver 302. In step 604, the gateway 101 receives the message, unpacks the message and packs the measured value and the timestamp into a message according to the protocol of the bus system of the receiver node. The gateway 101 then forwards the new message onto the bus of the receiver node. In step 605, the receiver node receives the message and extracts the measured value and the timestamp from the message.

It should also be noted that, if, during the time synchronization, the timestamp of the Sync Message matches the time of the slot 214 of the gateway 101 as the master node on the FlexRay bus system 120 (or if information relating to the offset between the timestamp of the Sync Message and the time of the slot 214 is contained in the Sync Message), a transmitter of a message on a first bus system (e.g. on a CAN bus system 130) can take this information into account in the transmission of a message. This is advantageous particularly if the message is to be transmitted on the FlexRay bus 120, in order to thus reduce the transit time of the message through the system 100. In particular, the message can be transmitted by the transmitter node in such a way that the dwell time of the message in the gateway 101, due to the waiting for the transmit slot 214 of the gateway 101 in the FlexRay bus system 120, is reduced (minimized).

As already described above, the gateway 101 (as the Boundary Clock, BDC, within the meaning of the PTP protocol) can receive its clock time from a high-order GrandMaster. For example, the gateway 101, as the BDC, can synchronize its clock time with a clock time of the instrument cluster in the vehicle. If a GPS receiver is present in the vehicle, the very precise GPS time can be used as the GrandMaster, and the clock time of the instrument cluster and the clock time of the gateway 101 can be synchronized with the GPS time.

In one exemplary embodiment, the instrument cluster is connected via a CAN bus 130 and/or via an Ethernet bus 110 to the gateway 101. In the start-up of the system 100, the instrument cluster, as the PTP GrandMaster, transmits its time information to the gateway 101, which synchronizes its clock time with the clock time received from the instrument cluster. The gateway 101 then acts as the BDC and synchronizes the clock time in the further bus systems. As soon as the GPS receiver has determined a precise clock time, the GPS receiver can take over the PTP GrandMaster role from the instrument cluster. This can take place automatically, or in response to an RPC command. If no GPS receiver is available, the clock time of the instrument cluster or a clock time retained in the gateway can be used for the time synchronization.

In this document, methods and devices have been described for increasing the significance of measured data and/or control data which are transmitted beyond the boundaries of different bus systems in a vehicle. In particular, methods and devices have been described for synchronizing a uniform time in the different bus systems of a vehicle. Due to the presence of a uniform time, it is possible to provide measurement data and/or control data with a timestamp and thus inform the receiver of the measurement data and/or the control data of the precise age of the measurement data and/or the control data. The timestamp increases the meaningfulness of the measurement data and/or control data and thus enables the implementation of a multiplicity of new time-critical vehicle functions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component of a communication system in a vehicle having two or more fieldbus systems, comprising:
   a gateway coupled to the two or more fieldbus systems, wherein the gateway is programmed to:
   forward a payload message from a first node of a first fieldbus system to a second node of a second fieldbus system, the first and second fieldbus systems being different types of bus systems;
   synchronize a first clock in the first node of the first fieldbus system with a second clock in the second node of the second fieldbus system;
   generate a timestamp on a basis of a reference time, wherein the timestamp corresponds to a generation time of the timestamp;
   transmit the timestamp in a first message according to a first protocol of the first fieldbus system to the first node of the first fieldbus system; and
   transmit the timestamp in a second message according to a second protocol of the second fieldbus system to the second node, wherein the first and second protocols are different.

2. The component according to claim 1, wherein the gateway is coupled to a serial asynchronous fieldbus system as the first fieldbus system and a serial synchronous fieldbus system as the second fieldbus system.

3. The component according to claim 2, wherein the first fieldbus system is a CAN fieldbus system and the second fieldbus system is a FlexRay fieldbus system.

4. The component according to claim 1, wherein the gateway is further programmed to:
   generate the timestamp as a segment from a Precision Time Protocol (PTP) timestamp.

5. The component according to claim 4, wherein the timestamp is generated from a nanosecondsField of the PTP timestamp.

6. The component according to claim 5, wherein:
   the timestamp has a maximum measurable time period; and
   the maximum measurable time period corresponds to or exceeds a transit time of payload messages from the first node to the second node.

7. The component according to claim 6, wherein the gateway is further programmed to:
   transmit the second message in a predefined time window of the second bus system; and
   determine the timestamp such that the timestamp corresponds to a time of the predefined time window.

8. The component according to claim 7, wherein the gateway is further programmed to:
   receive the reference time from a GPS receiver or an instrument cluster of the vehicle.

9. The component according to claim 1, wherein:
   the timestamp has a maximum measurable time period; and
   the maximum measurable time period corresponds to or exceeds a transit time of payload messages from the first node to the second node.

10. The component according to claim 1, wherein the gateway is further programmed to:
    transmit the second message in a predefined time window of the second bus system; and
    generate the timestamp such that the timestamp corresponds to a time within the predefined time window within which the second message is to be transmitted.

11. The component according to claim 1, wherein the gateway is further programmed to:
    receive the reference time from a GPS receiver or an instrument cluster of the vehicle.

12. The component according to claim 1, wherein the gateway is further programmed to:
    synchronize the first clock in the first node with the second clock in the second node using a Precision Time Protocol method.

13. A node of a CAN bus system in a vehicle, the node comprising:
    a clock that generates a timestamp with a predefined measurable time period and a predefined time resolution; and a control unit coupled with the clock that provides a payload to be transmitted over the CAN bus system with a payload timestamp.

14. The node according to claim 13, wherein the payload timestamp has a shortened measurable time period as the predefined measurable time period and/or has an increased time resolution as the predefined time resolution.

15. A method for synchronizing a synchronous bus system of a vehicle with an asynchronous bus system of the vehicle, the method comprising the acts of:
  generating a timestamp on a basis of a reference time, wherein the timestamp corresponds to a generation time of the timestamp;
  determining a time interval between said timestamp and a transit time window of the synchronous bus system;
  correcting the timestamp using the determined time interval; and
  transmitting a message over the synchronous bus system with the corrected time stamp within the transit time window.

16. The method according to claim 15, wherein the method synchronizes the time in an asynchronous bus system by transmitting a further message with the timestamp and the time interval in the asynchronous bus system, the asynchronous bus system being different from the synchronous bus system.

* * * * *